United States Patent
Sasahara et al.

(10) Patent No.: US 11,567,220 B2
(45) Date of Patent: Jan. 31, 2023

(54) SEMICONDUCTOR IC, ELECTRONIC DEVICE, AND POSITIONING METHOD

(71) Applicant: SEIKO EPSON CORPORATION, Tokyo (JP)

(72) Inventors: Hideo Sasahara, Suwa (JP); Eiji Kinoshita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 161 days.

(21) Appl. No.: 17/082,596

(22) Filed: Oct. 28, 2020

(65) Prior Publication Data

US 2021/0132238 A1    May 6, 2021

(30) Foreign Application Priority Data

Oct. 30, 2019  (JP) .............................. JP2019-197245

(51) Int. Cl.

| | |
|---|---|
| *G01S 19/42* | (2010.01) |
| *G01S 19/30* | (2010.01) |
| *G01S 19/39* | (2010.01) |
| G01S 19/44 | (2010.01) |
| G01S 19/29 | (2010.01) |
| H04B 1/06 | (2006.01) |

(52) U.S. Cl.
CPC .............. *G01S 19/42* (2013.01); *G01S 19/30* (2013.01); *G01S 19/396* (2019.08); *G01S 19/29* (2013.01); *G01S 19/44* (2013.01); *H04B 1/06* (2013.01)

(58) Field of Classification Search
CPC ............................... G01S 19/42; G01S 19/396
See application file for complete search history.

(56) References Cited

U.S. PATENT DOCUMENTS

| | | | | |
|---|---|---|---|---|
| 6,317,077 | B1 * | 11/2001 | Soleimani ................. | G01S 5/12 342/357.77 |
| 6,771,211 | B2 * | 8/2004 | Syrjarinne ................ | G01S 5/02 342/357.65 |
| 7,436,355 | B2 * | 10/2008 | Nicholson ............... | G01S 19/20 342/357.58 |
| 7,567,208 | B2 * | 7/2009 | Mo ......................... | G01S 19/42 342/357.78 |
| 8,193,976 | B2 * | 6/2012 | Shen ....................... | G01S 19/42 342/357.58 |
| 8,581,779 | B2 * | 11/2013 | van Diggelen ......... | G01S 19/42 342/357.25 |
| 2002/0163467 | A1 * | 11/2002 | Martikka ................ | G01S 19/40 342/357.23 |

(Continued)

Primary Examiner — Gregory C. Issing
(74) *Attorney, Agent, or Firm* — Chip Law Group

(57) ABSTRACT

A first positioning portion, a calculator, and a second positioning portion are provided in an electronic device targeted for positioning. The first positioning portion obtains, by Doppler positioning, a candidate position which is a candidate for an initial position of the electronic device in code phase positioning from radio waves received from each of GPS satellites. The calculator calculates an index value indicating the magnitude of variation in code phase from a difference between a code phase obtained from the radio waves received from each of the GPS satellites and a code phase obtained based on a candidate position and a position of each GPS satellite. The second positioning portion performs the code phase positioning using ZCount or a candidate position according to the index value.

5 Claims, 5 Drawing Sheets

(56) References Cited

U.S. PATENT DOCUMENTS

| | | | |
|---|---|---|---|
| 2004/0203853 A1* | 10/2004 | Sheynblat | G01S 1/026 |
| | | | 455/12.1 |
| 2005/0055160 A1* | 3/2005 | King | G01S 19/42 |
| | | | 701/469 |
| 2008/0246661 A1* | 10/2008 | Nagahara | G01S 19/258 |
| | | | 342/357.67 |
| 2009/0002226 A1* | 1/2009 | Mo | G01S 19/42 |
| | | | 342/357.78 |

* cited by examiner

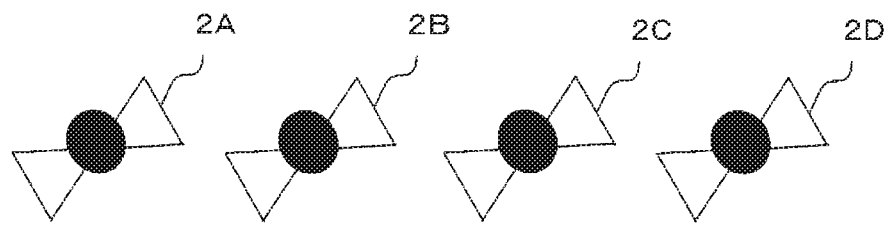
FIG. 1
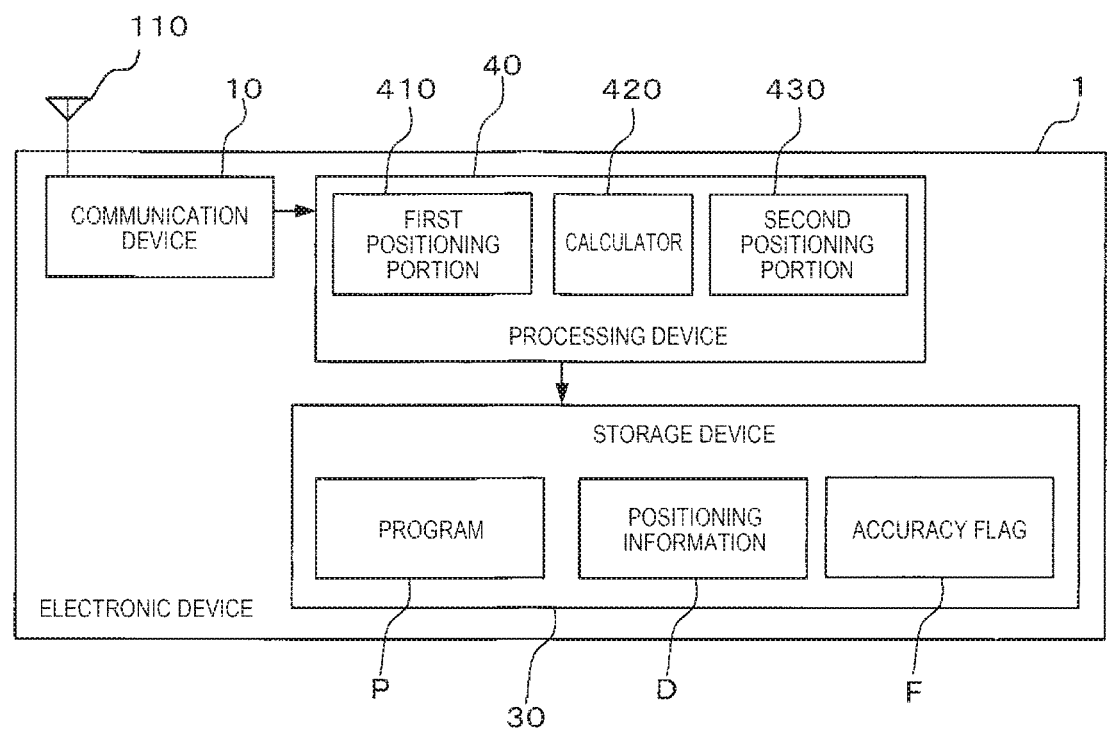

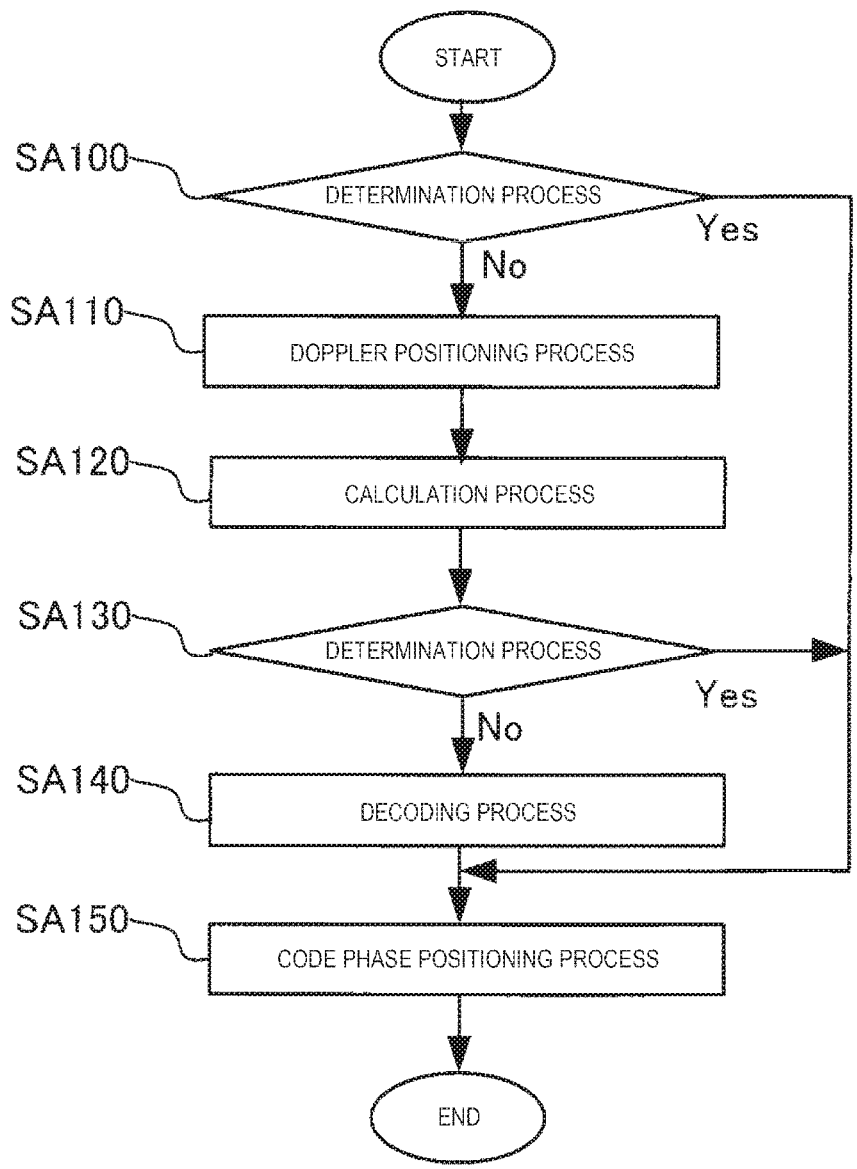

SEMICONDUCTOR IC, ELECTRONIC DEVICE, AND POSITIONING METHOD

The present application is based on, and claims priority from JP Application Serial Number 2019-197245, filed Oct. 30, 2019, the disclosure of which is hereby incorporated by reference herein in its entirety.

BACKGROUND

1. Technical Field

The present disclosure relates to a semiconductor IC, an electronic device, and a positioning method.

2. Related Art

Specific examples of a positioning method in a global positioning system or global positioning satellite (GPS) include code phase positioning and Doppler positioning. In the code phase positioning, a distance between each of four GPS satellites whose positions are known and an electronic device targeted for positioning is obtained, and a three-dimensional coordinate value indicating a position of the electronic device is specified based on the distance. The reason why four GPS satellites are used is that the timepiece included in the electronic device is not always accurate and a time error on the electronic device side needs to be set as an unknown number in addition to the three-dimensional coordinate value indicating the position of the electronic device. The distance between the electronic device targeted for positioning and the GPS satellite is represented as a product of the sum of the time required for a radio wave to reach the electronic device targeted for positioning from the GPS satellite and the time error in the electronic device, and the speed of light. A value obtained by multiplying the time required for the radio wave to reach the electronic device targeted for positioning from the GPS satellite by the speed of light is called a pseudo distance. This pseudo distance is calculated as follows.

In the code phase positioning, if a moving speed of an electronic device equipped with a GPS communication module is assumed to be 150 km/h and the elapsed time from the previous positioning is within one hour, the position specified by the previous positioning is set as an initial position and the pseudo distance is calculated based on the initial position, a navigation message superimposed on a carrier wave of the radio wave transmitted from the GPS satellite, and a C/A code. In this case, an accuracy of the initial position is within 150 km. The C/A code is a PRN code that differs for each satellite, and a length of the C/A code is 1023 chips per millisecond, which is approximately 293 m per chip when converted to a distance. The pseudo distance is divided into an integer part corresponding to an integer multiple of the C/A code and a fractional part less than 1023 chips, and this fractional part is called a code phase. The code phase can be obtained by observing the radio wave received from the GPS satellite. On the other hand, the integer part is estimated based on the initial position and the position of the satellite obtained from the navigation message. The pseudo distance is calculated by adding the estimated integer part and the code phase obtained by the observation.

In contrast, when the elapsed time from the previous positioning exceeds one hour, the pseudo distance is calculated based on an arrival time required for the radio wave transmitted from the GPS satellite to reach the electronic device targeted for positioning. The reason why a position obtained by the previous positioning is not used when the elapsed time from the previous positioning exceeds one hour is that there is a possibility that a difference of more than 150 km between the position and an actual electronic device position is present and if the integer part is estimated using the position having the difference of more than 150 km, a big jump in which the position greatly changes compared to the previous positioning may occur. To calculate the arrival time, it is essential to decode ZCount broadcast from the satellite every six seconds in order to notify the current time. Depending on a type and usage of the electronic device targeted for positioning, the elapsed time from the previous positioning often exceeds one hour. Since it takes approximately six seconds to decode ZCount, in code phase positioning, if the elapsed time from the previous positioning exceeds one hour, a waiting time of approximately six seconds occurs before the positioning is performed.

In Doppler positioning, the position of the electronic device is directly calculated from a difference between a frequency at the time of transmission of the radio wave transmitted by the GPS satellite and a frequency of the radio wave received by the electronic device targeted for positioning. In Doppler positioning, the accuracy of the initial position does not matter, and decoding of ZCount is not needed. For that reason, according to Doppler positioning, positioning can be performed immediately. U.S. Pat. No. 6,771,211 describes that a pseudo distance in the code phase positioning is calculated by setting a position obtained by Doppler positioning as an initial position.

The code phase positioning has a problem that when the elapsed time from the previous positioning exceeds one hour, a waiting time of approximately six seconds occurs prior to the execution of positioning. On the other hand, Doppler positioning has a problem that the accuracy is lower than that of the code phase positioning and an error of 150 km or more may be included. For that reason, if the position obtained by Doppler positioning is unconditionally used as the initial position in the code phase positioning, a big jump may occur. There is also a problem in Doppler positioning that the higher the moving speed of the GPS communication module, the lower the positioning accuracy becomes. As such, there is no technique for performing accurate positioning while avoiding occurrence of a waiting time as much as possible prior to the execution of positioning.

SUMMARY

In order to solve the problems described above, a semiconductor IC according to an aspect of the present disclosure includes a first positioning portion that obtains, by Doppler positioning, a candidate position from a first radio wave received from a first satellite by the communication module, a second radio wave received from a second satellite by the communication module, a third radio wave received from a third satellite by the communication module, and a fourth radio wave received from a fourth satellite by the communication module. The candidate position obtained by Doppler positioning is a candidate for an initial position of a communication module based on which code phase positioning of the communication module is performed. A calculator calculates a first code phase from a position of the first satellite and the candidate position, a second code phase from a position of the second satellite and the candidate position, a third code phase from a position of the third satellite and the candidate position, and a fourth code phase from a position of the fourth satellite and the candidate position. The calculator then calculates a first difference which is a difference between the first code phase and a code phase obtained by observing the first radio wave, a second difference which is a difference between the second code phase and a code phase obtained by observing the second radio wave, a third difference which is a difference between the third code phase and a code phase obtained by observing the third radio wave, and a fourth difference which is a difference between the fourth code phase and a code phase obtained by observing the fourth radio wave. Further, the calculator calculates an index value representing a magnitude of error associated with the candidate position based on the first difference, the second difference, the third difference, and the fourth difference. A second positioning portion performs code phase positioning using either the candidate position or ZCount according to the index value.

In order to solve the problems described above, an electronic device according to another aspect of the present disclosure includes a communication module that receives a radio wave transmitted from a satellite and the semiconductor IC.

In order to solve the problems described above, a positioning method according to another aspect of the present disclosure includes obtaining, by Doppler positioning, a candidate position from a first radio wave received from a first satellite by the communication module, a second radio wave received from a second satellite by the communication module, a third radio wave received from a third satellite by the communication module, and a fourth radio wave received from a fourth satellite by the communication module. The candidate position obtained by Doppler positioning is a candidate for an initial position of a communication module based on which code phase positioning of the communication module is performed. The positioning method further includes calculating a first code phase from a position of the first satellite and the candidate position, a second code phase from a position of the second satellite and the candidate position, a third code phase from a position of the third satellite and the candidate position, and a fourth code phase from a position of the fourth satellite and the candidate position. In addition, the positioning method includes calculating a first difference which is a difference between the first code phase and a code phase obtained by observing the first radio wave, a second difference which is a difference between the second code phase and a code phase obtained by observing the second radio wave, a third difference which is a difference between the third code phase and a code phase obtained by observing the third radio wave, and a fourth difference which is a difference between the fourth code phase and a code phase obtained by observing the fourth radio wave. In addition, the positioning method includes calculating an index value representing a magnitude of error associated with the candidate position based on the first difference, the second difference, the third difference, and the fourth difference. Furthermore, the positioning method includes performing code phase positioning using either the candidate position or ZCount according to the index value.

BRIEF DESCRIPTION OF THE DRAWINGS

FIG. 1 is a block diagram illustrating an electrical configuration example of an electronic device according to an embodiment of the present disclosure.

FIG. 6 is a flowchart illustrating a flow of a positioning method executed by a processing device according to a program in the electronic device.

DESCRIPTION OF EXEMPLARY EMBODIMENTS

Figure 2:
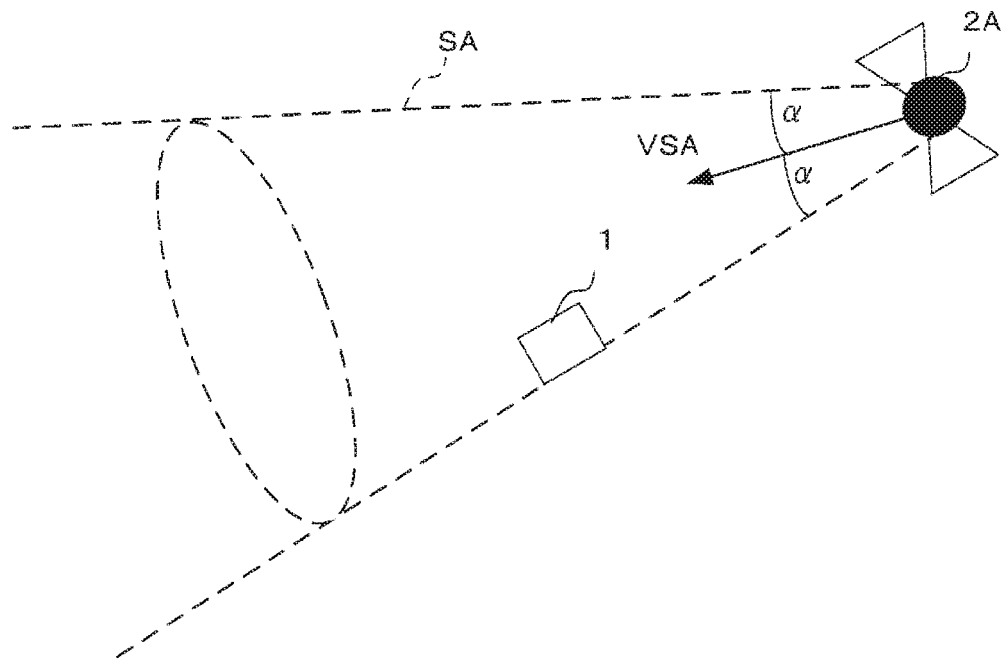
FIG. 2 is a diagram for illustrating Doppler positioning.

Hereinafter, embodiments will be described with reference to the accompanying drawings. Various technically preferable limitations are given to the embodiments described below, but the embodiments are not limited to these aspects.

1. Embodiment

FIG. 1 is a block diagram illustrating a configuration of an electronic device 1 according to an embodiment of the present disclosure. The electronic device 1 is a tablet terminal having a function of specifying a position of the electronic device 1 based on a radio wave transmitted from a GPS satellite and displaying the time according to a time zone including the specified position. In addition to the electronic device 1, a GPS satellite 2A, a GPS satellite 2B, a GPS satellite 2C, and a GPS satellite 2D among twenty four GPS satellites included in the GPS are illustrated in FIG. 1. The GPS satellite 2A is an example of a first GPS satellite in the present disclosure. The GPS satellite 2B is an example of a second GPS satellite in the present disclosure. The GPS satellite 2C is an example of a third GPS satellite in the present disclosure. The GPS satellite 2D is an example of a fourth GPS satellite in the present disclosure. Hereinafter, when it is not necessary to distinguish between the GPS satellite 2A, the GPS satellite 2B, the GPS satellite 2C, and the GPS satellite 2D, the GPS satellites are denoted as a GPS satellite 2.

As illustrated in FIG. 1, the electronic device 1 includes a communication device 10, a storage device 30, and a processing device 40. The electronic device 1 includes an input device that allows a user to input various instructions, a timing device that measures time, and a display device that displays various information, in addition to the communication device 10, the storage device 30, and the processing device 40. However, since the input device, the timing device, and the display device have little relation to the present disclosure, illustration thereof is omitted in FIG. 1. Hereinafter, detailed description of the input device, the timing device, and the display device will be omitted.

Although not illustrated in detail in FIG. 1, the communication device 10 is coupled to the processing device 40 via an interface such as UART, SPI, or I2C. The communication device 10 is coupled to an antenna 110 that receives a radio wave transmitted from the GPS satellite 2. The communication device 10 is a GPS communication module that demodulates information superimposed on the radio wave received by the antenna 110. The radio wave received by the communication device 10 from the GPS satellite 2A is an example of a first radio wave in the present disclosure. The radio wave received by the communication device 10 from the GPS satellite 2B is an example of a second radio wave in the present disclosure. The radio wave received by the communication device 10 from the GPS satellite 2C is an example of a third radio wave in the present disclosure. The radio wave received by the communication device 10 from the GPS satellite 2D is an example of a fourth radio wave in the present disclosure.

Under the control of the processing device 40, the communication device 10 outputs frequency information indicating a frequency of the radio wave received by the antenna 110 and information superimposed on the received radio wave to the processing device 40. Specific examples of the information superimposed on the radio waves received by the antenna 110 include ZCount, a C/A code, and a navigation message. As described above, ZCount is broadcast from the GPS satellite 2 every six seconds to notify the current time. The C/A code is a PRN code that differs for each satellite. A length of the C/A code is 1023 chips per millisecond, which is approximately 293 m per chip when converted to a distance. The navigation message is used to specify the position and moving speed of the GPS satellite 2 that is a transmission source of the navigation message.

The storage device 30 includes a read only memory (ROM) and a random access memory (RAM). A program P for causing the processing device 40 to execute a positioning method according to the present disclosure is stored in the storage device 30 in advance. Every time positioning of the electronic device 1 is performed, the storage device 30 stores positioning information D indicating the time when positioning is performed and a position at which the positioning is performed. The storage device 30 stores an accuracy flag F indicating whether or not the position indicated by the positioning information D is appropriate as an initial position in the code phase positioning. Although the details will be described later, the accuracy flag F is set to "1" if the elapsed time from the previous positioning is within one hour, and is set to "0" if the elapsed time from the previous positioning exceeds one hour.

The processing device 40 is configured to include a processor such as a central processing unit (CPU). The processing device 40 may be configured with a single processor or may be configured with a plurality of processors. The processing device 40 may include the storage device 30, and the processing device 40 may be integrated with the communication device 10. The processing device 40 starts executing the program P when the power of the electronic device 1 is turned on, and controls each portion of the electronic device 1. The processing device 40 being operated according to the program P functions as a first positioning portion 410, a calculator 420, and a second positioning portion 430. The first positioning portion 410, the calculator 420, and the second positioning portion 430 in this embodiment are software modules realized by operating the processing device 40 according to the program P.

The first positioning portion 410 obtains, by Doppler positioning, a candidate position that is a candidate for the initial position of the electronic device 1 in the code phase positioning. More specifically, the first positioning portion 410 calculates a frequency difference between a frequency of the radio wave received from the GPS satellite 2A and a frequency when the radio wave is transmitted. Similarly, the first positioning portion 410 calculates the frequency difference between each of the radio wave received from the GPS satellite 2B, the radio wave received from the GPS satellite 2C, and the radio wave received from the GPS satellite 2D and the frequency when each radio wave is transmitted.

Then, the first positioning portion 410 calculates the position of the electronic device 1 from the four frequency differences calculated in the manner as described above and the position and moving speed of each of the GPS satellite 2A, the GPS satellite 2B, the GPS satellite 2C, and the GPS satellite 2D.

For example, the candidate position of the electronic device 1 specified using the radio wave received from the GPS satellite 2A is the position on a conical surface SA indicated by the broken line in FIG. 2. VSA in FIG. 2 means the moving speed of the GPS satellite 2A. An angle α in FIG. 2 is an angle between a vector from the position of the GPS satellite 2A to an arbitrary position on the conical surface SA and a vector representing the moving speed of the GPS satellite 2A. The first positioning portion 410 generates a mathematical expression illustrated in the following expression (1) for each of the GPS satellite 2A, the GPS satellite 2B, the GPS satellite 2C, and the GPS satellite 2D. In the expression (1) below, a subscript i means any of A, B, C and D. In the following expression (1), $VS_i$ is a vector representing the moving speed of the GPS satellite 2 indicated by the subscript i, and $PS_i$ is a vector representing the position of the GPS satellite 2 indicated by the subscript i. $VS_i$ and $PS_i$ are known values obtained from the navigation message. In the following expression (1), $d_i$ is a value obtained by multiplying the GPS satellite 2 indicated by the subscript i and the magnitude of the moving speed by the cosine of the angle α, P is a vector indicating the position of the electronic device 1, and V is a vector representing the moving speed of the electronic device 1.

$$d_i = \frac{(PS_i - P)}{|PS_i - P|} \cdot (VS_i - V) \tag{1}$$

Then, the first positioning portion 410 obtains a velocity difference ($VS_i$–V) on the right side of the expression (1) from the frequency difference for the GPS satellite 2 indicated by the subscript i, makes the expression (1) generated for each of the GPS satellite 2A, the GPS satellite 2B, the GPS satellite 2C, and the GPS satellite 2D simultaneous, and solves the expression (1) for P, thereby calculating the position of the electronic device 1. The reason why the four GPS satellites 2 are used is that the observed $d_i$ includes a clock drift in the electronic device 1 and estimation of four parameters of the position P (x, y, z) of the electronic device 1 and the clock drift is needed.

Figure 3:
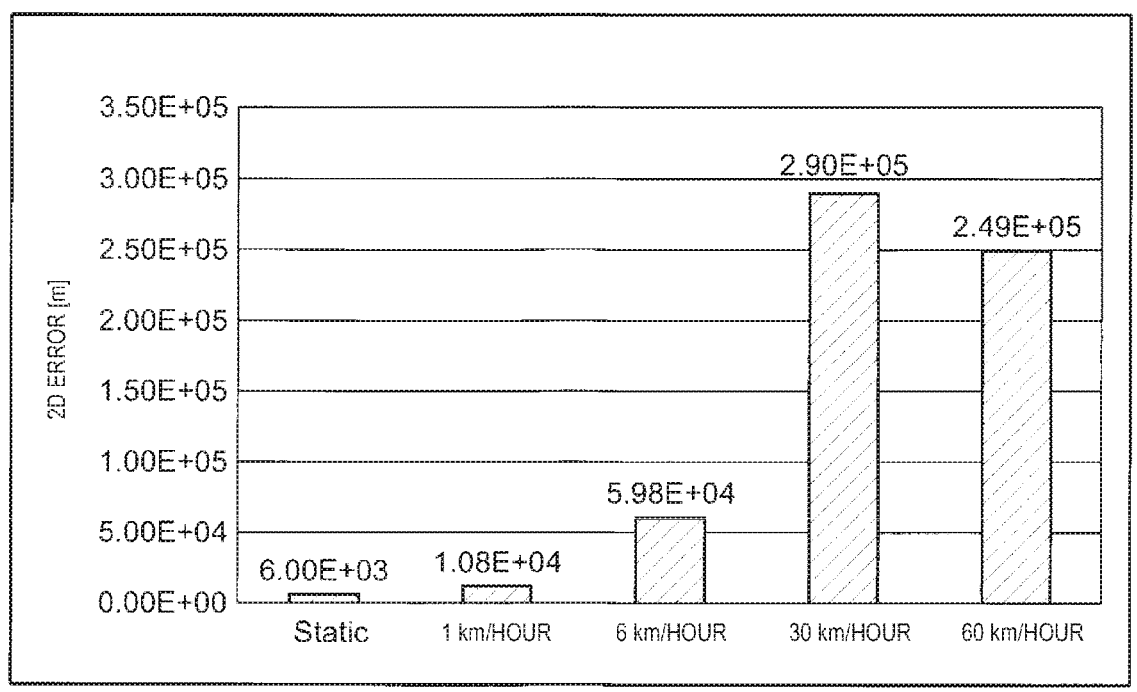
FIG. 3 is a diagram illustrating a relationship between an accuracy of Doppler positioning and a moving speed of the electronic device.

In this embodiment, although the first positioning portion 410 obtains a candidate position that is a candidate for an initial position in the code phase positioning, this candidate position cannot always be used as the initial position. This is because, as described above, Doppler positioning has a weak point that the accuracy decreases as the moving speed increases in a situation where the electronic device 1 is moving. The inventor of the present application performed simulation regarding the accuracy of Doppler positioning for each of a case where the electronic device 1 is stationary, a case where the electronic device is moving at a speed of 1 km/h, a case where the electronic device is moving at a speed of 6 km/h, a case where the electronic device is moving at a speed of 30 km/h, and a case where the electronic device is moving at a speed of 60 km/h. FIG. 3 is a diagram illustrating a result of the simulation. As illustrated in FIG. 3, the error included in the position obtained by Doppler positioning increases as the moving speed of the electronic device 1 increases. It is found out that the maximum error exceeds 150 km when the moving speed of the electronic device 1 is 30 km/h and when the moving speed is 60 km/h.

Figure 4:
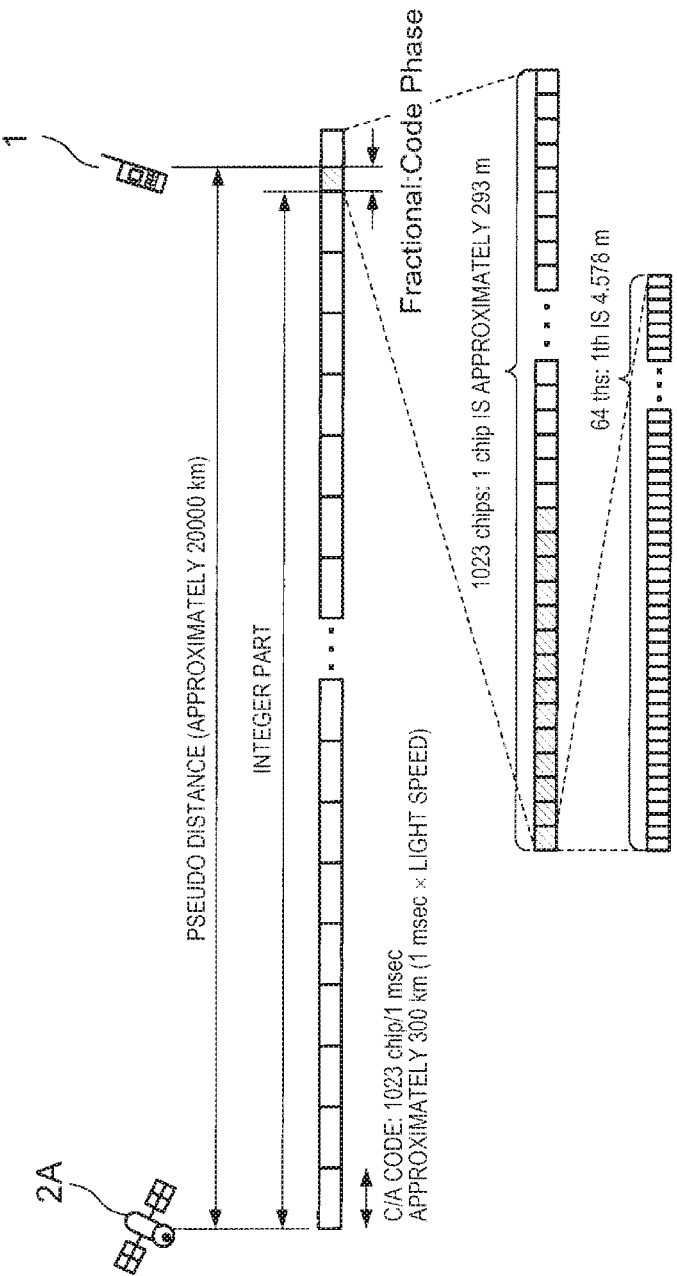
FIG. 4 is a diagram illustrating a relationship between a pseudo distance between an electronic device targeted for positioning and a GPS satellite, a code phase, and a C/A code.

The calculator 420 calculates a first code phase from the position of the GPS satellite 2A and the candidate position. There is a relationship illustrated in FIG. 4 between the pseudo distance between the electronic device 1 and the GPS satellite 2A, the code phase, and the C/A code. The calculator 420 calculates a candidate value of the pseudo distance between the GPS satellite 2A and the electronic device 1 from the position of the GPS satellite 2A and the candidate position, and sets the remainder obtained by dividing this candidate value by the length of the C/A code as the first code phase. Similarly, the calculator 420 calculates a second code phase from the position of the GPS satellite 2B and the candidate position, calculates a third code phase from the position of the GPS satellite 2C and the candidate position, and calculates a fourth code phase from the position of the GPS satellite 2D and the candidate position.

Next, the calculator 420 calculates a first difference, which is a difference between the first code phase and the code phase obtained by observing the radio wave transmitted from the GPS satellite 2A. Similarly, the calculator 420 calculates the second difference, which is the difference between the second code phase and the code phase obtained by observing the radio wave transmitted from the GPS satellite 2B, the third difference, which is the difference between the third code phase and the code phase obtained by observing the radio wave transmitted from the GPS satellite 2C, and the fourth difference, which is the difference between the fourth code phase and the code phase obtained by observing the radio wave transmitted from the GPS satellite 2D.

Then, the calculator 420 calculates an index value indicating the magnitude of variation in the first code phase, the second code phase, the third code phase, and the fourth code phase from the four differences obtained in the manner as described above. More specifically, the calculator 420 calculates an index value that decreases as variation in the first code phase, the second code phase, the third code phase, and the fourth code phase decreases. Accordingly, the index value when variation in the first code phase, the second code phase, the third code phase, and the fourth code phase is small is smaller than the index value when variation in the first code phase, the second code phase, the third code phase, and the fourth code phase is large. In this embodiment, the calculator 420 calculates standard deviation of the four differences as the index value.

Figure 5:
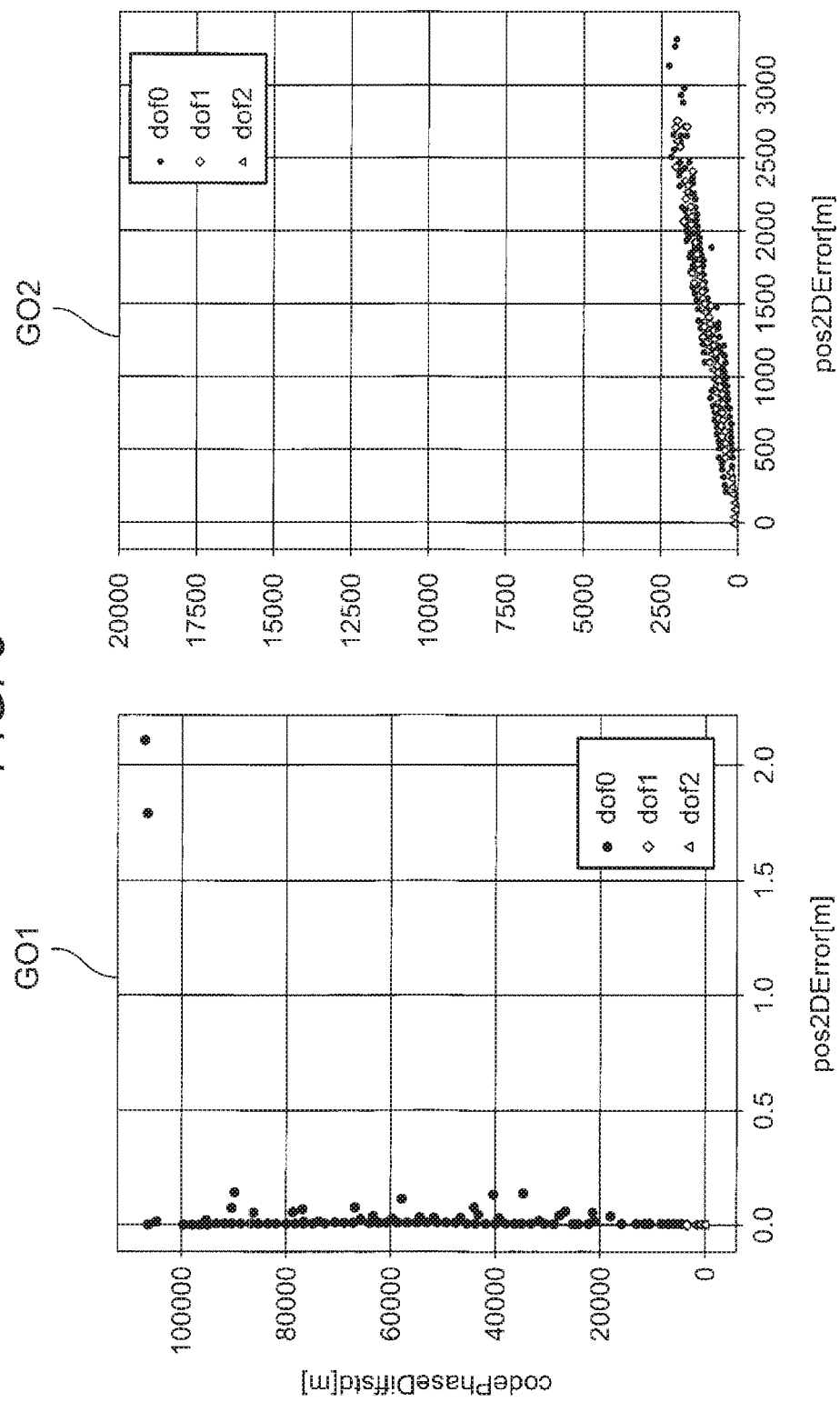
FIG. 5 is a diagram illustrating a relationship between variation in the code phase and the accuracy of Doppler positioning.

In this embodiment, the reason for calculating the index value indicating the magnitude of variation in the first code phase, the second code phase, the third code phase, and the fourth code phase is as follows. Graphs G01 and G02 illustrated in FIG. 5 represent a relationship between the standard deviation, which is an example of the index value, and the error included in the candidate position obtained by Doppler positioning. The graph G02 is a graph in which a portion, whose standard deviation in the graph G01 is 20000 or less, is expanded.

As illustrated in the graph G02 of FIG. 5, there is a strong correlation between the index value indicating the magnitude of variation in the first code phase, the second code phase, the third code phase, and the fourth code phase and the magnitude of the error included in the candidate position. Specifically, an error included in the candidate position when the index value is small is smaller than an error included in the candidate position when the index value is large. That is, the index value indicating the magnitude of variation in the first code phase, the second code phase, the third code phase, and the fourth code phase represents the magnitude of the error included in the candidate position, and can be used to evaluate reliability of the candidate position. This is the reason why the index value indicating the magnitude of variation in the first code phase, the second code phase, the third code phase, and the fourth code phase is calculated.

The second positioning portion 430 performs the code phase positioning according to the index value calculated by the calculator 420 and the accuracy flag F. More specifically, when the accuracy flag F is "1", the second positioning portion 430 performs the code phase positioning using the position indicated by the positioning information D as the initial position, similarly as in the related art. On the other hand, when the accuracy flag F is "0", the second positioning portion 430 performs the code phase positioning using either the candidate position or ZCount according to the index value calculated by the calculator 420. More specifically, if the index value calculated by the calculator 420 is larger than a predetermined threshold value, the second positioning portion 430 estimates the integer part of the pseudo distance between the GPS satellite 2 and the electronic device 1 by using the decoding result of ZCount, calculates the pseudo distance using this integer part, and specifies the position of the electronic device 1 using the calculated pseudo distance.

More specifically, when assuming that $PS_j$ is a vector representing the position of the GPS satellite 2 indicated by the subscript j, $PD_j$ is a pseudo distance between the GPS satellite 2 and the electronic device 1 indicated by the subscript j, P is a vector indicating the position of the electronic device 1, c is the speed of light, and $\Delta t$ is an time error in the electronic device, the following expression (2) is established. The subscript j means any one of A, B, C and D.

$$PD_j = |PS_j - P| - c\Delta t \quad (2)$$

The second positioning portion 430 generates the expression (2) for each of the GPS satellite 2A, the GPS satellite 2B, the GPS satellite 2C, and the GPS satellite 2D, makes these four expressions simultaneous, and solves these four expressions for P, thereby calculating the position of the electronic device 1.

In contrast, if the index value calculated by the calculator 420 is equal to or less than the predetermined threshold value, the second positioning portion 430 sets the candidate position obtained by the first positioning portion 410 as the initial position of the electronic device 1, estimates the integer part of the pseudo distance between the GPS satellite 2 and the electronic device 1 from this initial value position and the position of the GPS satellite 2 obtained from the navigation message, calculates the pseudo distance using this integer part, and specifies the position of the electronic device 1 using the calculated pseudo distance.

The processing device 40 being operated according to the program P periodically executes a positioning method according to the present disclosure at time intervals shorter than, for example, one hour. However, when the electronic device 1 is operating in a sleep mode or the like, the positioning method may not be executed, and positioning may be executed after a time exceeding one hour is elapsed from the previous positioning. FIG. 6 is a flowchart illustrating a flow of a positioning method executed by the processing device 40 according to the program P. As illustrated in FIG. 6, the positioning method in this embodiment includes a determination process SA100, a Doppler positioning process SA110, a calculation process SA120, a determination process SA130, a decoding process SA140, and a code phase positioning process SA150.

In the determination process SA100, the processing device 40 refers to the positioning information D stored in the storage device 30 and determines whether or not the elapsed time from the previous positioning is within one hour. When the determination result in the determination process SA100 is "Yes", the processing device 40 sets the accuracy flag F to "1" and executes the code phase positioning process SA150. In contrast, when the determination result in the determination process SA100 is "No", the processing device 40 sets the accuracy flag F to "0" and executes the Doppler positioning process SA110.

In the Doppler positioning process SA110, the processing device 40 functions as the first positioning portion 410 and executes Doppler positioning. A candidate position is obtained by this Doppler positioning.

In the calculation process SA120, the processing device 40 functions as the calculator 420, and calculates the index value indicating variation in the first code phase, the second code phase, the third code phase, and the fourth code phase.

In each of the determination process SA130, the decoding process SA140, and the code phase positioning process SA150, the processing device 40 functions as the second positioning portion 430. In the determination process SA130, the processing device 40 determines whether or not the index value calculated in the calculation process SA120 is less than or equal to a predetermined threshold value. When the determination result in the determination process SA130 is "No", that is, when the index value calculated in the calculation process SA120 is larger than the predetermined threshold value, the processing device 40 executes the decoding process SA140 and the code phase positioning process SA150. In contrast, when the determination result in the determination process SA130 is "Yes", that is, when the index value calculated in the calculation process SA120 is less than or equal to the predetermined threshold value, the processing device 40 executes the code phase positioning process SA150 without executing the decoding process SA140.

In the decoding process SA140, the processing device 40 decodes ZCount superimposed on the radio waves received from each of the GPS satellite 2A, the GPS satellite 2B, the GPS satellite 2C, and the GPS satellite 2D.

In the code phase positioning process SA150, the processing device 40 first determines whether or not a value of the accuracy flag F is "1", and when it is determined that the value of the accuracy flag F is "1", the processing device 40 performs the code phase positioning using the position indicated by the positioning information D as the initial position of the electronic device 1. In contrast, when it is determined that the value of the accuracy flag F is "0", if the index value calculated in the calculation process SA120 is larger than the predetermined threshold value, the processing device 40 performs the code phase positioning using the ZCount decoded in the decoding process SA140, and if the index value is less than or equal to the predetermined threshold value, the processing device 40 performs the code phase positioning using the candidate position as the initial position.

As described above, in the electronic device 1 of this embodiment, when the elapsed time from the previous positioning exceeds one hour, Doppler positioning is executed. Then, when reliability of the candidate position obtained by Doppler positioning is evaluated to be high, the code phase positioning is executed using the candidate position as the initial position. When the reliability of the candidate position obtained by Doppler positioning is evaluated to be high, decoding of ZCount is not performed, and thus even when the elapsed time from the previous positioning exceeds one hour, the waiting time does not always occur prior to the execution of positioning. When the reliability of the candidate position obtained by Doppler positioning is evaluated to be low, in the electronic device 1 of the present embodiment, the code phase positioning is performed using the decoding result of ZCount without using the position obtained by Doppler positioning. For that reason, the occurrence of a big jump can be avoided as compared with the case where the code phase positioning is performed unconditionally using the candidate position obtained by Doppler positioning as the initial position. As such, according to this embodiment, positioning of the electronic device 1 can be accurately performed while avoiding the occurrence of the waiting time prior to the execution of the positioning as much as possible.

2. Modification Example

The following modifications may be appropriately combined with the embodiment described above.

(1) The communication device 10 in the embodiment described above is a GPS communication module that receives a radio wave transmitted from the GPS satellite 2. However, the communication device 10 may be a global navigation satellite system (GNSS) communication module that receives a radio wave transmitted from a satellite included in a multi-GNSS, or may be a communication module that receives a radio wave transmitted from a satellite included in other satellite systems such as BeiDou, GLONASS, QZS, and Galileo. In short, the communication device 10 may be any communication module that receives a radio wave transmitted from a satellite included in a satellite system. In the embodiment described above, an application example of the present disclosure to a tablet terminal including the GPS communication module is described. However, the application target of the present disclosure may be an electronic device including a communication module, and may be a vehicle-mounted electronic device such as a smartphone, an electronic timepiece, or a car navigation device. In the embodiment described above, although standard deviation is used as an index value indicating the magnitude of variation in the first code phase, the second code phase, the third code phase, and the fourth code phase, other statistics such as an average value of the first difference, the second difference, the third difference and the fourth difference, a t value, or a p value may be used.

(2) In the embodiment described above, although the determination process SA100 for determining whether or not the elapsed time from the previous positioning exceeds one hour is executed prior to the Doppler positioning process SA110, the determination process SA100 can be omitted. This is because even if the determination process SA100 is omitted, it is possible to accurately perform positioning of the electronic device while avoiding occurrence of a waiting time as much as possible prior to the execution of positioning.

(3) In the embodiment described above, the program. P that causes the processing device 40 to function as the first positioning portion 410, the calculator 420, and the second positioning portion 430 is already stored in the storage device 30. However, the program P may be manufactured or distributed as a single element. As a specific distribution method of the program P, a mode in which the program is distributed by being written in a computer-readable recording medium such as a flash read only memory (ROM) or a mode in which the program is distributed by being downloaded through a telecommunication line such as the Internet can be considered. By installing the program in an electronic device that includes a computer such as a CPU and a communication module that receives the radio wave transmitted from the satellite included in the satellite system and operating the computer of the electronic device according to the program, the electronic device can be made to function as the electronic device according to the present disclosure.

(4) The first positioning portion 410, the calculator 420, and the second positioning portion 430 in the embodiment described above are software modules realized by operating the processing device 40 according to the program. P. However, part or all of first positioning portion 410, the calculator 420, and the second positioning portion 430 may be realized by hardware such as a digital signal processor (DSP), an application specific integrated circuit (ASIC), a programmable logic device (PLD), and a field programmable gate array (FPGA). Even if part or all of the first positioning portion 410, the calculator 420, and the second positioning portion 430 are hardware, the same effect as that of the embodiment described above is achieved.

(5) In the embodiment, the electronic device 1 according to one embodiment of the present disclosure is described. However, a semiconductor IC that executes the positioning method illustrated in FIG. 6, that is, a semiconductor IC that includes the first positioning portion 410, the calculator 420, and the second positioning portion 430 may be manufactured or sold as a single element. By incorporating this semiconductor IC into an electronic device including the communication module that receives the radio wave transmitted from the satellite included in the satellite system, the electronic device can be made to function as the electronic device according to the present disclosure.

3. Aspects Grasped from at Least One of the Embodiments and Each Modification Example The present disclosure is not limited to the embodiments and modification examples described above, and can be realized in various aspects without departing from the spirit thereof. For example, the present disclosure can be realized by the following aspects. The technical features in the embodiments described above corresponding to the technical features in each aspect described below can be replaced or combined as appropriate in order to solve part or all of the problems of the present disclosure, or to achieve part or all of the effects of the present disclosure. If the technical features are not described as essential in this specification, the technical features can be appropriately deleted.

A semiconductor IC according to one aspect described above includes a first positioning portion, a calculator, and a second positioning portion. The first positioning portion obtains, by Doppler positioning, a candidate position that is a candidate for an initial position of a communication module in code phase positioning from a first radio wave, a second radio wave, a third radio wave, a fourth radio wave received by the communication module. The first radio wave is a radio wave received from a first satellite by the communication module. The second radio wave is a radio wave received from a second satellite by the communication module. The third radio wave is a radio wave received from a third satellite by the communication module. The fourth radio wave is a radio wave received from a fourth satellite by the communication module. The calculator calculates a first difference which is a difference between a first code phase calculated from a position of the first satellite and the candidate position and a code phase obtained by observing the first radio wave. The calculator calculates a second difference which is a difference between a second code phase calculated from a position of the second satellite and the candidate position and a code phase obtained by observing the second radio wave. The calculator calculates a third difference which is a difference between a third code phase calculated from a position of the third satellite and the candidate position and a code phase obtained by observing the third radio wave. The calculator calculates a fourth difference which is a difference between a fourth code phase calculated from a position of the fourth satellite and the candidate position and a code phase obtained by observing the fourth radio wave. Then, the calculator calculates an index value indicating a magnitude of variation in the first code phase, the second code phase, the third code phase, and the fourth code phase from the first difference, the second difference, the third difference, the fourth difference. The second positioning portion performs the code phase positioning using either the candidate position or ZCount according to the index value. According to this aspect, since the code phase positioning is not performed unconditionally using the candidate position obtained by Doppler positioning, positioning of the communication module can be performed accurately. According to this aspect, the code phase positioning may be performed using the candidate position obtained by Doppler positioning without using ZCount, and it may be possible to avoid occurrence of a waiting time prior to the execution of positioning.

In the semiconductor IC according to one aspect described above, it is preferable that the index value when variation is small is smaller than the index value when variation is large. If the index value is larger than a predetermined threshold value, the second positioning portion preferably performs the code phase positioning using ZCount, and if the index value is equal to or less than the predetermined threshold value, the second positioning portion preferably performs the code phase positioning using the candidate position. According to this aspect, when it is evaluated that variation in the difference between the first code phase, the second code phase, the third code phase, and the fourth code phase and a true code phase is small and an accuracy of Doppler positioning is high, it is possible to perform the code phase positioning using the candidate position obtained by Doppler positioning as an initial position without using ZCount.

In the semiconductor IC according to one aspect described above, it is preferable that the calculator calculates standard deviation of the first code phase, the second code phase, the third code phase, and the fourth code phase as the index value. According to this aspect, an accuracy of the candidate position can be evaluated by using the standard deviation of the difference between the first code phase, the second code phase, the third code phase, and the fourth code phase and the true code phase.

An electronic device according to one aspect described above includes a communication module that receives a radio wave transmitted from a satellite, and the semiconductor IC according to any one of the aspects described above. Also, according to this aspect, positioning can be performed accurately while avoiding occurrence of a waiting time as much as possible prior to the execution of positioning.

A positioning method according to one aspect described above includes a first positioning process, a calculation process, and a second positioning process. In the first positioning process, a candidate position that is a candidate for an initial position of a communication module in code phase positioning is obtained, by Doppler positioning, from a first radio wave, a second radio wave, a third radio wave, a fourth radio wave received by the communication module. The first radio wave is a radio wave received from a first satellite by the communication module. The second radio wave is a radio wave received from a second satellite by the communication module. The third radio wave is a radio wave received from a third satellite by the communication module. The fourth radio wave is a radio wave received from a fourth satellite by the communication module. In the calculation process, a first difference which is a difference between a first code phase calculated from a position of the first satellite and the candidate position and a code phase obtained by observing the first radio wave is calculated. In the calculation process, a second difference which is a difference between a second code phase calculated from a position of the second satellite and the candidate position and a code phase obtained by observing the second radio wave is calculated. In the calculation process, a third difference which is a difference between a third code phase calculated from a position of the third satellite and the candidate position and a code phase obtained by observing the third radio wave is calculated. In the calculation process, a fourth difference which is a difference between a fourth code phase calculated from a position of the fourth satellite and the candidate position and a code phase obtained by observing the fourth radio wave is calculated. Then, in the calculation process, an index value indicating a magnitude of variation in the first code phase, the second code phase, the third code phase, and the fourth code phase is calculated from the first difference, the second difference, the third difference, the fourth difference. In the second calculation process, the code phase positioning is performed using either the candidate position or ZCount according to the index value. Also, according to this aspect, positioning can be performed accurately while avoiding occurrence of a waiting time as much as possible prior to the execution of positioning.

What is claimed is:

1. A semiconductor IC comprising:
a first positioning portion that obtains, by Doppler positioning, a candidate position based on each of a first radio wave received from a first satellite, a second radio wave received from a second satellite, a third radio wave received from a third satellite, and a fourth radio wave received from a fourth satellite, wherein
the candidate position is a candidate for an initial position of a communication module,
the initial position is a position based on which code phase positioning of the communication module is performed, and
each of the first radio wave, the second radio wave, the third radio wave and the fourth radio wave is received by the communication module;
a calculator that calculates a first code phase from a position of the first satellite and the candidate position, a second code phase from a position of the second satellite and the candidate position, a third code phase from a position of the third satellite and the candidate position, and a fourth code phase from a position of the fourth satellite and the candidate position, wherein
the calculator calculates each of a first difference, a second difference, a third difference, and a fourth difference,
the first difference is a difference between the first code phase and a code phase obtained by observing the first radio wave,
the second difference is a difference between the second code phase and a code phase obtained by observing the second radio wave,
the third difference is a difference between the third code phase and a code phase obtained by observing the third radio wave,
the fourth difference is a difference between the fourth code phase and a code phase obtained by observing the fourth radio wave, and
the calculator calculates an index value based on the first difference, the second difference, the third difference, and the fourth difference, wherein the index value represents a magnitude of error associated with the candidate position; and
a second positioning portion that performs code phase positioning of the communication module using one of the candidate position or decoding of ZCount, wherein
the ZCount is superimposed on each of the first radio wave, the second radio wave, the third radio wave and the fourth radio wave received by the communication module,
when the index value is larger than a predetermined threshold value, the second positioning portion performs the code phase positioning using the ZCount, and
when the index value is equal to or less than the predetermined threshold value, the second positioning portion performs the code phase positioning using the candidate position as the initial position.

2. The semiconductor IC according to claim 1, wherein the index value decreases as a magnitude of variation in the first code phase, the second code phase, the third code phase, and the fourth code phase decreases, and the index value increases as the magnitude of variation in the first code phase, the second code phase, the third code phase, and the fourth code phase increases.

3. The semiconductor IC according to claim 1, wherein the calculator calculates standard deviation of the first difference, the second difference, the third difference, and the fourth difference as the index value.

4. An electronic device comprising:
the semiconductor IC according to claim 1; and
the communication module.

5. A positioning method comprising:
obtaining, by Doppler positioning, a candidate position based on each of a first radio wave received from a first satellite, a second radio wave received from a second satellite, a third radio wave received from a third satellite, and a fourth radio wave received from a fourth satellite, wherein
the candidate position is a candidate for an initial position of a communication module,
the initial position is a position based on which code phase positioning of the communication module is performed, and
each of the first radio wave, the second radio wave, the third radio wave and the fourth radio wave is received by the communication module;
calculating a first code phase from a position of the first satellite and the candidate position, a second code phase from a position of the second satellite and the candidate position, a third code phase from a position of the third satellite and the candidate position, and a fourth code phase from a position of the fourth satellite and the candidate position;

calculating each of a first difference, a second difference, a third difference, and a fourth difference, wherein
- the first difference is a difference between the first code phase and a code phase obtained by observing the first radio wave,
- the second difference is a difference between the second code phase and a code phase obtained by observing the second radio wave,
- the third difference is a difference between the third code phase and a code phase obtained by observing the third radio wave, and
- the fourth difference is a difference between the fourth code phase and a code phase obtained by observing the fourth radio wave;

calculating an index value based on the first difference, the second difference, the third difference, and the fourth difference, wherein the index value represents a magnitude of error associated with the candidate position; and performing code phase positioning of the communication module using one of the candidate position or decoding of ZCount, wherein
- the ZCount is superimposed on each of the first radio wave, the second radio wave, the third radio wave and the fourth radio wave received by the communication module,
- when the index value is larder than a predetermined threshold value, the second positioning portion performs the code phase positioning using the ZCount, and
- when the index value is equal to or less than the predetermined threshold value, the second positioning portion performs the code phase positioning using the candidate position as the initial position.

* * * * *